United States Patent [19]

Mori

[11] Patent Number: 4,979,492
[45] Date of Patent: Dec. 25, 1990

[54] SOLAR RAY COLLECTING DEVICE

[76] Inventor: Kei Mori, 3-16-3-501, Kaminoge,, Setagaya-ku, Tokyo, Japan

[21] Appl. No.: 474,181

[22] Filed: Feb. 2, 1990

[30] Foreign Application Priority Data

Mar. 3, 1989 [JP] Japan .................................... 1-52439

[51] Int. Cl.$^5$ .............................................. F24J 2/36
[52] U.S. Cl. .................... 126/424; 126/425; 126/440
[58] Field of Search .............. 126/424, 425, 450, 440; 353/3; 350/522, 254

[56] References Cited

U.S. PATENT DOCUMENTS

| | | | |
|---|---|---|---|
| 4,109,640 | 8/1978 | Smith | 126/425 |
| 4,276,872 | 7/1981 | Blake et al. | 126/425 |
| 4,524,758 | 6/1985 | Mori | 126/424 |

Primary Examiner—James C. Yeung
Attorney, Agent, or Firm—Jordan and Hamburg

[57] ABSTRACT

A solar ray collecting device including a supporting rod supported at its lower end by a rotating mechanism and carrying in its upper portion a horizontal supporting shaft is described. The supporting shaft intersects the supporting rod at a right angle and rotatably supports the mounting plates having a large number of solar ray collecting elements arranged thereon. A larger part of the solar ray collecting elements are mounted on a front mounting plate positioned in front of the supporting rod and the supporting shaft and the rest of the solar collecting elements are mounted on a mounting plate positioned behind the supporting rod and the supporting shaft. A supporting frame has a groove for allowing the supporting rod to permit the revolving of said frame.

1 Claim, 5 Drawing Sheets

4,979,492

SOLAR RAY COLLECTING DEVICE

BACKGROUND OF THE INVENTION

The present invention relates to a solar ray collecting device which is capable of collecting solar rays by means of a large number of solar ray collecting elements.

The present applicant has previously proposed a solar ray collecting device comprising a cylindrical base body, a supporting rod (a revolving shaft), a convex-shaped transparent dome secured to the base plate, a solar ray collecting element constructed integrally with the lens, whereto, at the center of its lower portion, the input end of the light-guiding cable is attached, a solar position sensor for detecting the sun's location, the solar ray collecting elements mounted on a mounting plate which is supported by the base plate, the base plate supported by the base body through a revolving shaft, a supporting arm for rotatably supporting said revolving shaft and a supporting rod for rotating said supporting arm about an axis intersecting that of said revolving shaft at a right angle, and the solar position sensor detecting the sun's location and acting to control the first and second revolving shafts so as to always direct the lens toward the sun.

In the above-mentioned prior art, the design where the base plate is rotatably supported by the supporting arm makes it difficult to manufacture a more compact and more powerful solar ray collecting device having a large number of solar ray collecting elements because of the lack of durability of the supporting arm. Furthermore, the positioning of the solar ray collecting elements in front of the revolving shaft (when viewed from the direction of the sun) produces a lop-sided load in the supporting system consisting of the revolving shaft, the supporting arm and the supporting rod.

SUMMARY OF THE INVENTION

It is an object of the present invention to provide a device which has a compact construction and is able to do efficient work with a balanced load for the support system.

It is another object of the present invention to provide a large-scale solar ray collecting device which can have a larger quantity of solar ray collecting elements by virtue of its suitable supporting system wherein a supporting rod can support rotatably the grooved center portion of a supporting frame having a group of solar ray collecting elements located in front of the supporting rod and the remainder, or at least a part of the remaining solar ray collecting elements, located at the rear of the supporting shaft so as to reduce the occurrence of an eccentric load at the support point.

DESCRIPTION OF THE PREFERRED EMBODIMENTS

Figure 1:
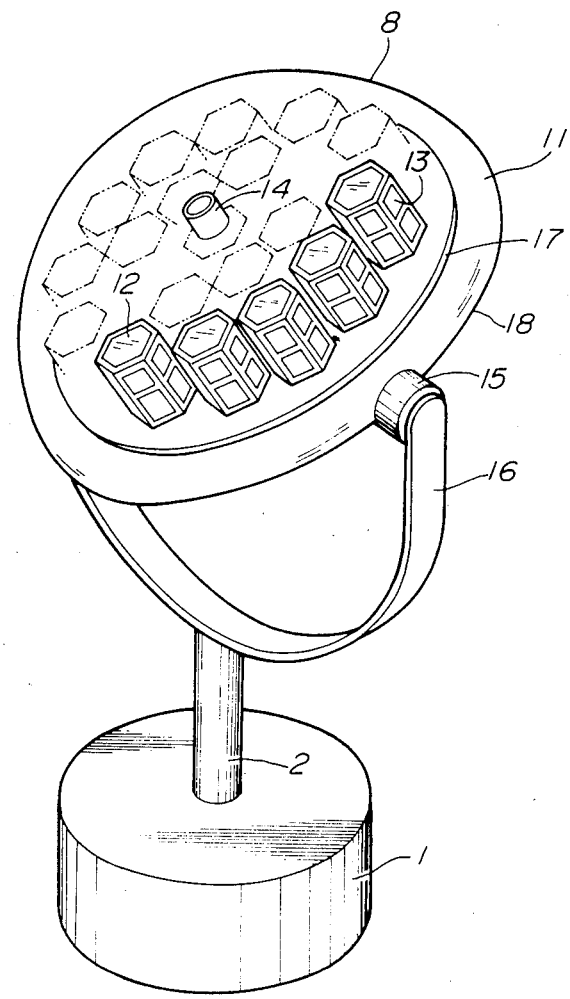
FIG. 1 is a perspective view for explaining a solar ray collecting device previously proposed by the present applicant.

FIG. 1 is a perspective view for explaining an example of a solar ray collecting device previously proposed by the present applicant. In FIG. 1, numeral 1 is a cylindrical base body, 2 is a supporting rod (a revolving shaft) and 8 is a convex-shaped transparent dome. The dome 8 is secured to the base plate 18. 13 is a solar ray collecting element constructed integrally with the lens 12, whereto, at the center of its lower portion, an input end of the light-guiding cable (not shown) is attached. 14 is a solar position sensor for detecting the sun's location. The solar ray collecting elements are mounted on a mounting plate 17 which is supported b the base plate 18. The base plate 18 is supported by the base body 1 through a revolving shaft 15, a supporting arm 16 for rotatably supporting said revolving shaft 15 and a supporting rod 2 for rotating said supporting arm about an axis intersecting that of said revolving shaft at a right angle. The solar position sensor 14 detects the sun's location and acts to control the first and second revolving shafts so as to always direct the lens 12 toward the sun.

In the above-mentioned prior art, the design where the base plate 18 is rotatably supported by the supporting arm 16 makes it difficult to manufacture a more compact and more powerful solar ray collecting device having a large number of solar ray collecting elements because of the lack of durability of the supporting arm. Furthermore, the positioning of the solar ray collecting elements in front of the revolving shaft 15 (when viewed from the direction of the sun) produces a lop-sided load in the supporting system consisting of the revolving shaft 15, the supporting arm 16 and the supporting rod 2.

The present invention was made in order to provide a device which is free of the above-mentioned drawbacks, i.e., it has a compact construction and is able to do efficient work with a balanced load for the support system.

To realize the above-mentioned object, the present invention is intended to provide a solar ray collecting device to include a supporting rod attached at its lower end to a rotating mechanism and carrying in its upper portion a horizontal supporting shaft which intersects said supporting rod at a right angle and rotatably supports the mounting plates having a large number of solar ray collecting elements mounted thereon, characterized in that a larger part of the solar ray collecting elements are mounted on a front mounting plate positioned in front of the supporting rod and the supporting shaft and the rest, or at least a part of the rest, of the solar collecting elements are mounted on a mounting plate positioned behind the supporting rod and the supporting shaft, and a supporting frame has a groove for allowing the supporting rod to permit the revolving of said frame. The front side of the device is always directed toward the sun. Hereinafter, a preferred embodiment is described with reference to the attached drawings.

Figure 2:
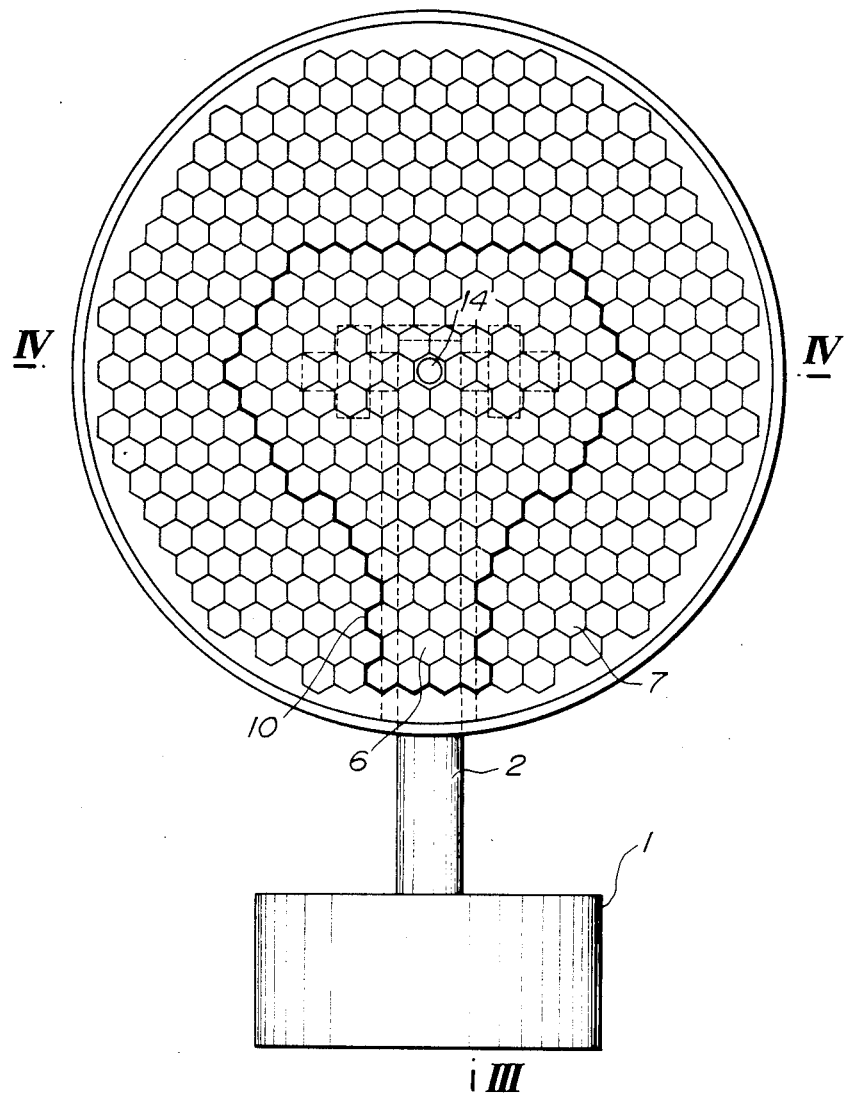
FIG. 2 is a front view for explaining a solar ray collecting device embodying the present invention.
Figure 3:
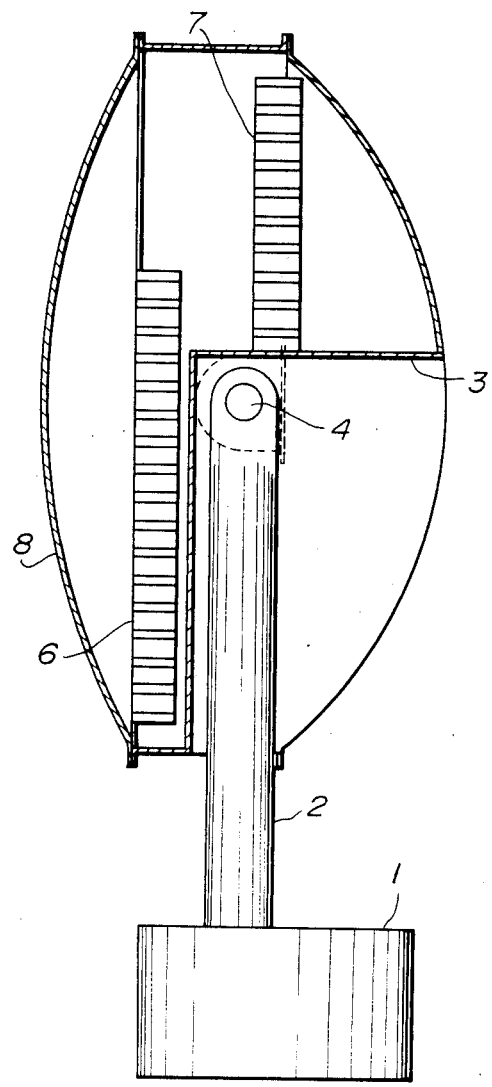
FIG. 3 is a sectional view taken on line III—III of FIG. 2.
Figure 4:
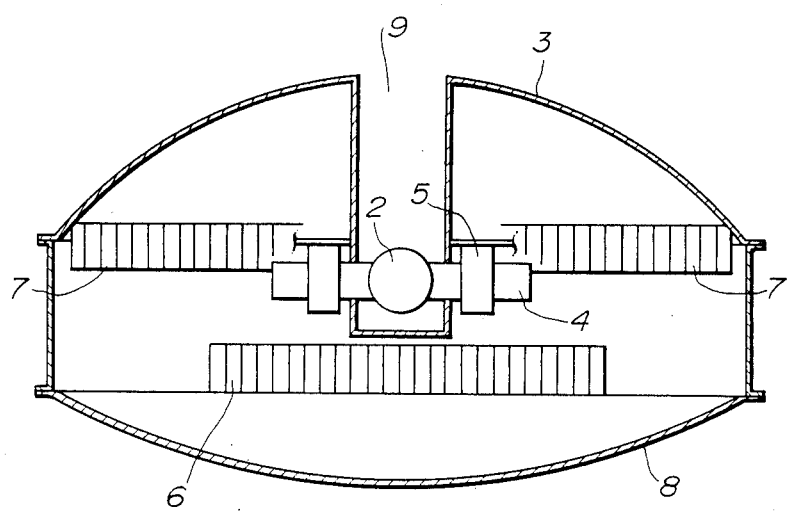
FIG. 4 is a sectional view taken on line IV—IV of FIG. 2.

FIG. 2 is a front view of a solar ray collecting device embodying the present invention and FIGS. 3 and 4 are sections taken on lines III—III and IV—IV respectively in FIG. 2. In these drawings, 1 is the base, 2 is the supporting rod, 3 is the supporting frame, 4 is the supporting shaft, 5 is the rotor, 6 and 7 are solar ray collecting elements, 8 is the transparent dome and 9 is a groove provided in the supporting frame.

In the same way as described above with reference to FIG. 1, each of the solar ray collecting elements 6 and 7 includes one lens for focusing sunlight and for holding at the focal point of said lens the input end of a light-guiding cable (not shown) which receives the sunlight focused by said lens and which transmits the same therethrough to wherever the light is needed. All the solar ray collecting elements are controlled, as mentioned above with reference to FIG. 1, by the output signal of a solar-positioning sensor 14 so as to be always directed toward the sun i.e. by rotating the supporting rod 2 with the rotor in the base body 2. The supporting frame 3 is provided with a groove 9 in its lower half so as to be supported by the supporting rod 2 positioned in said groove 9. The supporting frame 3 is connected through the rotating mechanism 5 to the supporting shaft 4 secured to the upper portion of the supporting rod 2. The solar ray collecting elements may be secured by any suitable means to the supporting frame 3 in such a way that the front group 6 of the solar ray collecting elements, which corresponds to the supporting rod and the supporting shaft 4, namely, to the part enclosed by a bold line in FIG. 2, is located at the front of the supporting shaft 4, and the remaining groups 7 of solar ray collecting elements are located at the rear of the frame. In this case, the distribution of the solar ray collecting elements shall be made in such a way that at least a group of the solar ray collecting elements correspond to the supporting rod 2, the supporting shaft 4, and the rotating mechanism 5 is positioned at the front side of the supporting frame 3. While the remaining groups may all be located at the rear of the supporting frame 3, it is optimum to arrange said groups so as to set the gravity center of all the groups supported by the rotating mechanisms 5 at a point intersecting the supporting rod 2 and the supporting shaft 4.

As is apparent from the foregoing description, according to the present invention, it may be possible to provide a large-scale solar ray collecting device which can have a larger quantity of solar ray collecting elements by virtue of its suitable supporting system wherein a supporting rod can support rotatably the grooved center portion of a supporting frame having a group of solar ray collecting elements located in front of the supporting rod and the remainder, or at least a part of the remaining solar ray collecting elements, located at the rear of the supporting shaft so as to reduce the occurrence of an eccentric load at the support point.

Figure 5:
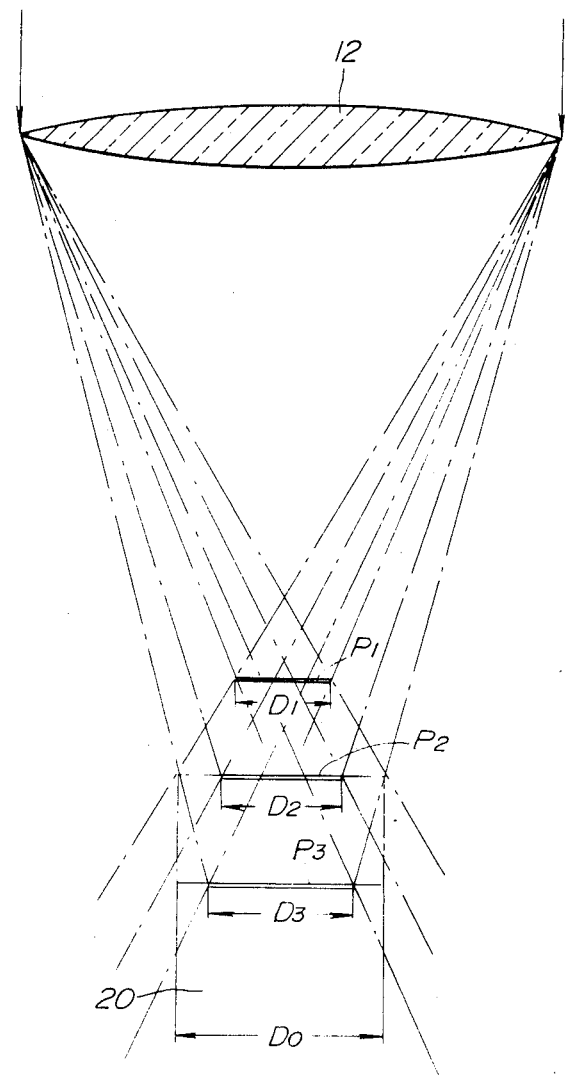
FIG. 5 is a view for explaining a principle for guiding the sunlight into a fiber optic cable.

FIG. 5 is a view for explaining how to guide the light rays collected by the lens 31 into the light guide.

In FIG. 5, 12 is a Fresnel lens or the like and 20 is a light guide for receiving the sunlight focused by said lens and transmitting the same there-through to any desired place. In the case of focusing the sunlight through the lens system, the solar image has a central portion consisting of almost white light and a circumferential portion containing therein a large amount of the light components having wave-lengths corresponding to the focal point of the lens system. Namely, in the case of focusing sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3.

Consequently, when the light-receiving end-surface of the light guide is set at position P1, it is possible to collect sunlight containing plenty of blue color components at the circumferential portion thereof. When the light-receiving end-surface of the light guide is set at position P2, it is possible to collect sunlight containing plenty of green color components at the circumferential portion thereof. When the light-receiving end-surface of the light guide is set at position P3 it is possible to collect sunlight containing plenty of red color components at the circumferential portion thereof. In each case, the diameter of the light guided can be selected in accordance with the light components to be collected. For instance, the required diameters of the light guides are D1, D2 and D3, respectively, depending on the colors of the light rays desired, i.e. the blue, green and red colors. In such a way, the required amount of the fiber optic cable can be saved and thereby the sunlight containing therein plenty of the desired color components can be collected most effectively.

And further, as shown in FIG. 5, if the diameter of the light-receiving end-surface of the fiber optic cable is enlarged to D0, it may be possible to collect light containing therein all of the visible wavelength components, but not containing ultraviolet rays and infrared rays.

It is also possible that the light-receiving surfaces of the light guides 20 are fixed at the focal plane of the lens system beforehand by a manufacturer or said light-receiving surfaces of the light guides are adjustable in the light axis direction of the lens system and regulated by the user to a desired point so as to obtain the desired colored light.

As mentioned above, when the sunlight is focused through a lens system, the solar image has a central portion full of white color light and a circumferential portion, the content of which varies depending upon the distance from the lens system. Namely, at a short distance from the lens system, blue color light is gathered and at a large distance from the lens system, red color light is gathered. By adjusting the set position of the light-receiving faces of the light guides it is possible to eliminate infrared and ultraviolet rays from the sunlight and thus obtain sunlight that is suitable for sunbathing and for cultivating animals and plants.

I claim:

1. A solar ray collecting device comprising a supporting rod supported at its lower end by a rotating mechanism and carrying in its upper portion a horizontal supporting shaft, said supporting shaft intersecting said supporting rod at a right angle and rotatably supporting a frame means having mounting plates, a plurality of solar ray collecting elements arranged on said mounting plates, one of said plurality of mounting plates being a front mounting plate positioned in front of said supporting rod and said supporting shaft, another of said plurality of mounting plates being a rear mounting plate positioned to the rear of said supporting rod and said supporting shaft, some of said solar ray collecting elements being mounted on said front mounting plate and at least a part of the rest of said solar ray collecting elements being mounted on said rear mounting plate, said frame having a groove which receives said supporting rod to permit said frame to revolve about said supporting shaft.

* * * * *